Dec. 23, 1952     F. T. GAUSE     2,622,651

TIRE CHAIN

Filed Aug. 20, 1947

INVENTOR
FREDERICK TAYLOR GAUSE
BY
Pennie, Edmonds, Morton & Barrows
ATTORNEYS

Patented Dec. 23, 1952

2,622,651

UNITED STATES PATENT OFFICE 2,622,651

TIRE CHAIN

Frederick Taylor Gause, West Chester, Pa.; Harriet Douglas Gause executor of said Frederick Taylor Gause, deceased Application August 20, 1947, Serial No. 769,708

5 Claims. (Cl. 152—213)

This invention relates to tire chains and means for applying the same, and has for its object, the provision of an antiskid chain which may be applied to the tire of an automobile without jacking up the wheel or moving the car.

A further object of the invention is to provide a construction of this character incorporating improvements whereby the free ends of the side chains may be drawn together and connected without reaching through or under the vehicle wheel and directly manually operating the fastening members.

The ordinary tire chain comprises side chains of a length less than the outer periphery of the tire, the side chains being connected at intervals by cross chains for furnishing a tractive grip when the road surface is slippery. Various forms of connector devices are provided at the ends of the side chains by which they may be fastened together. In applying such chains to a vehicle, it is necessary either to move the vehicle onto the cross chains, then pull the chain around the wheel and connect the ends of the side chains or else jack up the wheel and apply the chain while the wheel is out of contact with the ground. In either of these cases, it is necessary to reach around, through or under the wheel and beneath the vehicle to pull the ends of the inner side chain together and connect the fastening means thereof.

My prior Patent No. 1,878,841 discloses a tire chain construction which facilitates the application of the chain to the wheel. The construction of my present invention constitutes an improvement over that of my noted prior patent, particularly in that my present construction is less expensive to manufacture and is simpler both in arrangement and in operation.

In describing the invention in detail, reference will be made to the accompanying drawing in which a specific embodiment of my improved tire chain has been illustrated. In the drawing.

Figure 1:
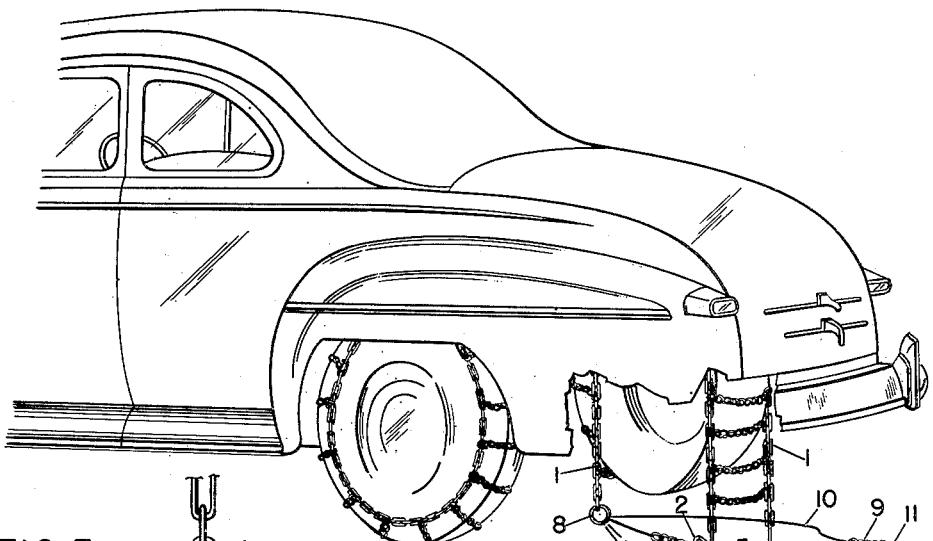
Figure 1 is a perspective view of the rear end of an automobile showing one of my improved tire chains in the course of application to a rear wheel.

In general, my invention contemplates the provision of improved means for drawing together and connecting the ends of one of the side chains of the conventional tire chain above described. The improved fastening or connecting means may comprise a part of the chain as originally constructed or may be supplied separately and secured to the conventional tire chain by the operator.

Referring to the drawing, the chain shown as illustrative of my invention includes side chains 1 connected by cross chains, these parts being of usual and known construction. In the disclosed embodiment, my improved fastening means for one side chain has been substituted for the conventional fastening means. To one end of one side chain 1, in lieu of the conventional connector device D such as shown at the end of the other chain there is provided a hook 2 of the construction shown in detail in Figs. 3, 4 and 5.

The hook 2 is preferably made of heavy wire of approximately 3/8" in diameter with an eye 3 at one end. The eye 3 is pivoted on a pin 4 passing through two similar eyes 5 in the ends of a link 6 carried by the end link of the side chain 1. The free end of the hook 2 is curved back on itself as shown to provide a comparatively large eye 7, the purpose of which will be later described. At the other end of the side chain 1 I provide a ring 8 of a size to permit the eye 7, at the end of the hook 2 to be readily drawn through the ring by means of the auxiliary device which will now be described.

Figure 3:
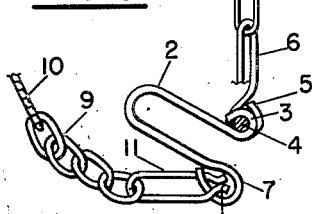
Figures 3, 4 and 5 are views on a further enlarged scale showing my improved chain fastening means at successive stages in the fastening operation of the device.
Figure 4:
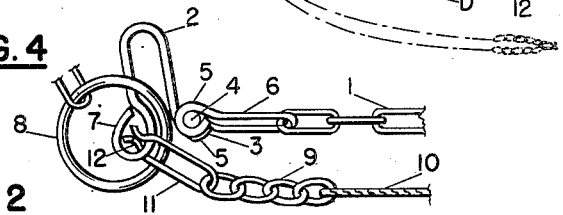
Figure 2:
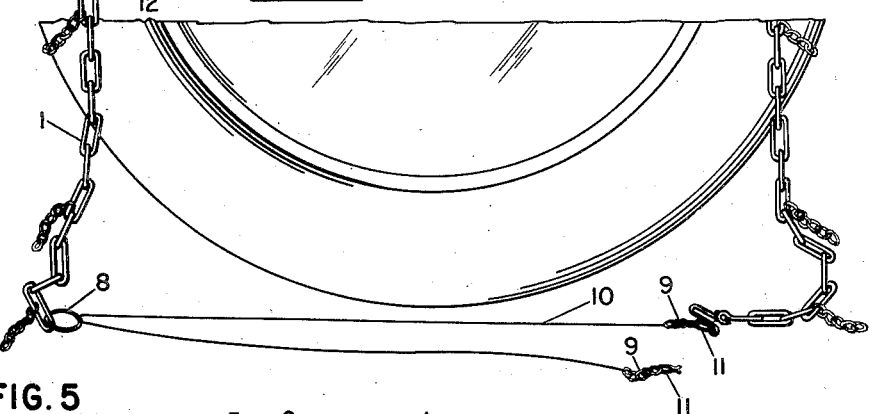
Figure 2 is an enlarged partial section of an automobile wheel, taken from the inner side thereof, with the improved tire chain partly applied thereto.
Figure 5:
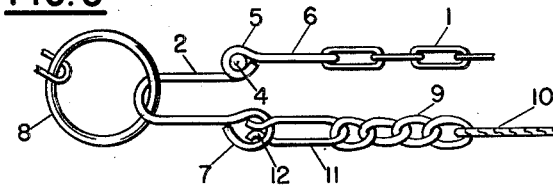

To apply my improved chain to a tire, I provide an auxiliary device comprising a cord or flexible cable 10 having a spring clip 11 of the construction shown in Figures 3, 4 and 5 secured to each end thereof with an intermediate short length of chain 9. The spring clip 11 is of general U shape and comprises a pair of resilient arms provided at their outer ends with oppositely disposed inwardly projecting rounded portions 12 beyond which the ends of the arms are bent outward as indicated.

The short lengths of chain 9 at each end of the cord or cable 10 serve the dual purpose of adding weight to the ends of the chain and also of guiding the clip 11 and hook 2 through the ring 8 at the end of the side chain 1.

In applying the chain to a wheel, the clip 11 at one end of the cord 10 is first passed through the ring 8 at one end of a side chain 1 and drawn through the ring to about midway the length of the cord. The chain is then dropped over the wheel with the side chain carrying the cord or cable 10 on the inner side of the wheel. If the chain is being applied to a rear wheel, as in Figure 1, the end of the side chain 1 carrying the cable 10 is placed at the front of the wheel as shown, whereas if application to a front wheel is desired, the cable end of the side chain is preferably disposed at the rearward side of the wheel. The chain is so placed on the tire that there is an equal amount of slack on each side of the wheel so that when the free ends of the chain are drawn together, they will meet at the lowest point of the wheel.

The free ends of the cable 10 carrying the short chains 9 and clips 11 connected thereto are now thrown back under the vehicle and around the wheel to a point where it can be readily picked up from beyond the end of the vehicle, as shown in dot-and-dash lines in Fig. 1. One clip 11 is now fastened to the eye 7 in the hook 2 by snapping the lugs 12 into the eye as shown in Fig. 3. The operator then pulls on the free end of the cable 10 thereby drawing the ends of the inner side chain 1 together as shown in Fig. 4 and ultimately drawing the free or open end of the hook 2 into the ring 8 as shown in Fig. 5. The cable 10 is thereafter readily removed by giving it a quick jerk which pulls the lugs 12 of the spring clip 11 out of the eye 7 in the hook 2. The free end of the hook 2 is long enough to secure the ends of the inner side chain together against accidental displacement, until put under tension by connecting the free ends of the outer chain.

It is not difficult to fasten the outer chain directly by hand and the conventional connectors D are designed to add some leverage to the force drawing the ends of the chain together so that by selecting the proper link near the end of the outer chain for receiving the fastener D both side chains can be drawn tight.

My improved hook and cable fastening means may be supplied as accessories to be secured to chains of conventional design or as shown may be connected to the chains when made and used in place of the conventional fastening devices. When sold for use with ordinary chains having fasteners such as shown at D at one end of each side chain, link 6, hook 2, pin 4 and ring 8 will be sold along with the cord 10 with the attached chain sections 9 and clips 11. The pin 4 is of a size to have a driving fit in the eyes 5 of the link 6 which are smaller than the eye 3 in the hook 2. When the buyer attaches the parts to the tire chain he closes the fastener D on the ring 8 so that the ring 8 forms one end of the side chain. He then puts one end of link 6 through a link near the other end of the same side chain, places the eye 3 of the hook 2 between the eyes 5 of the link 6 and drives the pin 4 into place, thus permanently securing the hook to the other end of the chain.

It will be understood that my improved fastening means may be variously modified without departing from the spirit of the invention. For example the hook 2 may be made of a size to co-operate directly with a link of the side chain thereby dispensing with the ring 8 and in the appended claims the term "ring" is used generally to include elongated links, and other shapes through which the cord 10 may be drawn.

I claim:

1. A fastening device for connecting the ends of a chain comprising, in combination, a hook consisting in part of an elongated member bent back on itself to provide an open loop with substantially parallel sides, one end of said hook being attached to one end of the chain and a ring for engaging said hook attached to the other end of the chain, means independent of the chain for drawing said hook into said ring, and a connection between said hook and said means releasable by a force applied to said means at a distance from said hook.

2. A fastening device for connecting the ends of a chain comprising, in combination, a hook consisting in part of an elongated member bent back on itself to provide an open loop with substantially parallel sides, one end of said hook being attached to one end of the chain and a ring for engaging said hook attached to the other end of the chain, a flexible member for drawing said hook into engagement with said ring, and releasable means for connecting one end of said flexible member to said hook adjacent the free end thereof.

3. A fastening device for connecting the ends of a chain comprising, in combination, a hook consisting in part of an elongated member bent back on itself to provide an open loop with substantially parallel sides, one end of said hook being attached to one end of the chain and a ring for engaging said hook attached to the other end of the chain, a flexible member for drawing said hook into engagement with said link, and means for detachably connecting said flexible member to said hook, comprising a spring clip carried by said flexible member and yieldingly engaging said hook adjacent the free end thereof in such a manner as to be released from said hook by a sudden pull on said flexible member.

4. A fastening device for connecting the ends of a chain comprising, in combination, a hook consisting in part of an elongated member bent back on itself to provide an open loop with substantially parallel sides, one end of said hook being attached to one end of the chain and a ring for engaging said hook attached to the other end of the chain, a flexible member insertable through said ring for drawing said hook into engagement with said ring, a weight on one end of said flexible member, and a spring clip on the other end of said flexible member releasably engageable with said hook adjacent the free end of said hook.

5. A fastening device for connecting the ends of a chain comprising, in combination, a hook consisting in part of an elongated member bent back on itself to provide an open loop with substantially parallel sides, one end of said hook being attached to one end of the chain and a ring for engaging said hook attached to the other end of the chain, said hook having an opening therethrough adjacent the free end thereof, a flexible member for drawing said hook into engagement with said ring, and means for detachably connecting said flexible member to said hook comprising an element on said flexible member having a pair of resiliently connecting arms and a pair of inwardly protruding substantially aligned lugs adjacent the ends of said arms for engagement in the opening in said hook.

FREDERICK TAYLOR GAUSE.

REFERENCES CITED

The following references are of record in the file of this patent:

UNITED STATES PATENTS

| Number | Name | Date |
| --- | --- | --- |
| 1,672,019 | Barber | June 5, 1928 |
| 1,878,841 | Gause | Sept. 20, 1932 |
| 2,436,715 | Everline | Feb. 24, 1948 |
| 2,462,378 | Fox | Feb. 22, 1949 |